United States Patent [19]

Sanders et al.

[11] 3,744,051

[45] July 3, 1973

[54] COMPUTER INTERFACE CODING AND DECODING APPARATUS

[75] Inventors: Ray W. Sanders; Stephen W. Harting, both of Los Angeles, Calif.

[73] Assignee: Computer Transmission Corporation, Los Angeles, Calif.

[22] Filed: Aug. 31, 1971

[21] Appl. No.: 176,662

[52] U.S. Cl. .......... 340/347 DD, 178/68
[51] Int. Cl. .......... H03k 13/24
[58] Field of Search .......... 179/2 DP; 340/347 DD; 178/66, 68; 328/119, 116, 117

[56] References Cited

UNITED STATES PATENTS

| | | | |
|---|---|---|---|
| 3,434,059 | 3/1969 | Kesolits | 340/347 DD |
| 3,369,181 | 2/1968 | Braymer | 178/68 |
| 3,400,369 | 9/1968 | Cooper | 340/347 DD |
| 3,461,390 | 8/1969 | Mack | 178/68 |

*Primary Examiner*—Thomas A. Robinson
*Attorney*—John E. Wagner

[57] ABSTRACT

Pulse coding and decoding apparatus designed particularly for data communications between computer centers or a central computer and remote terminals. Circuitry responsive to digital data converts trains of data to a symmetrical doublet pulse format at the clock rate of the data source. A transformer couples the energy to the transmission line.

A receiver section includes an automatic gain control of incoming signals. A threshold circuit eliminates signals below a predetermined level and discards the complementary signal of the doublet to reconstruct the original digital data train.

6 Claims, 10 Drawing Figures

COMPUTER INTERFACE CODING AND DECODING APPARATUS

BACKGROUND OF THE INVENTIN

Complex computer networks require that the transmission of digital data between computer installations must be accomplished with near perfect reliability regardless of the type of communications media available. Where installations to be connected are in excess of 2 miles the transmission characteristics of the line and its cross talk, switching transients and other forms of interference can severely limit the operation of the entire computer system.

Often the communications medium is not under the control of the computer user and improvements in the medium are not possible or practical. One approach to the improvement of reliability of data transmission is through the use of multiple switched channels, error correcting codes or redundant transmission of data. These approaches are generally satisfactory but require either excessive capital investment or reduction in available bandwidth or channel space available.

BRIEF STATEMENT OF THE INVENTION

Faced with this state of the art, we have invented improved pulse coding apparatus designed as an interface between computer installations and a communications line. The interface and coding apparatus includes logic circuitry for producing a doublet or complementary pulse for each pulse from the data source in a pulse train and for amplifying and combining the two pulses onto an outgoing line or transmission channel. The pulses are of the same position relative to framing or synchronization as the data source pulse.

The interface equipment also includes a receiver with a high pass filter for eliminating all low frequency components appearing on the line since they contain no information content. Low frequency interfering signals are thereby minimized. The receiver portion also includes automatic gain control amplifier means for establishing a standard level of received signal followed by a threshold circuit which serves to discriminate any signal components below a predetermined level. The receiver also includes means for further amplifying one polarity of a pulse train received, thereby restoring the information to the original format.

DETAILED DESCRIPTION OF THE DRAWINGS

The foregoing features of this invention may be more fully understood with the following detailed description by reference to the drawings in which.

DETAILED DESCRIPTION OF THE INVENTION

Figure 1:
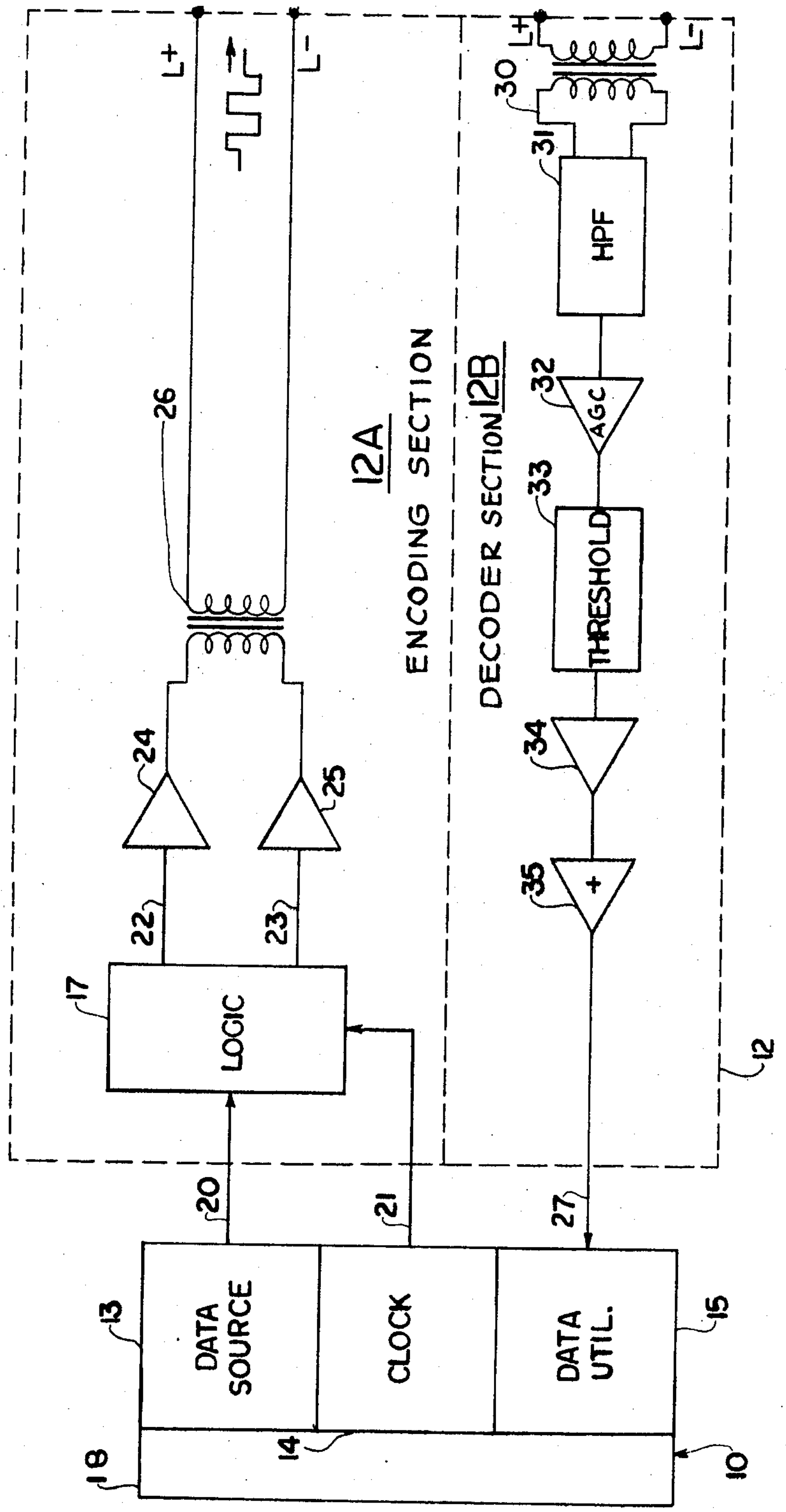
FIG. 1 is a block diagram of a computer communication system incorporating this invention.

Now referring to FIG. 1, computer installation 10 is illustrated connected to a transmission medium by the interface unit 12 of this invention. The computer installation is illustrated as including three basic sections intimately connected with the communications function they comprise: a data source 13, a clock 14, and a data utilization section 15. These constitute the three basic functions of either a central computer or a remote computer terminal. All other sections of computer installation 10 are generally designated herein as Block 18. Therefore, any functional computer or coded data installation or similar device providing pulses is illustrated by the block 10. It provides an outgoing train of data pulses on lead 20 and a train of clock pulses on lead 21. The computer installation 10 responds to incoming trains of data pulses on lead 27. In the encoding section 12A of the interface unit 12, the basic element is a logic circuit 17 more completely described in connection with FIG. 2. Suffice it to say, the logic circuit 17 produces on a pair of output leads 22 and 23 encoded data pulses of opposite polarity and with the pulses of lead 23 constituting the complement of each pulse on lead 22. These trains of pulses when amplified to the required transmission level in their respective amplifiers 24 and 25, are combined in transformer 26 as a composite wave form constituting a doublet or a positive excursion pulse corresponding to each pulse in the original data train followed by a negative excursion of equal and opposite amplitude and duration. The train of doublets is introduced into the transmission line L+, L− and, regardless of the characteristics of the transmission line or medium, we have found that the received wave form of the doublet is more easily detected than the original pulse train. This advantage of the invention is more clearly described in connection with FIGS. 4 and 5.

The receiver or decoder section **12*b* of this invention includes a transformer 30 connected to the terminals L+, L− via a transmission line or medium followed by a high pass filter 31 having a cutoff at or about 1/100 the data pulse frequency. The high pass filter is usable in this invention since the symmetrical wave form of the transmitted data itself carries no D.C. component and any D.C. component appearing on the line is noise or interference and may be eliminated without adversely affecting the data. The receiver 12*b* includes an AGC amplifier 32 designed to produce a standard peak-to-peak level of received pulses suitable for further discrimination. Such discrimination is accomplished through a threshold circuit 33 which discards all signal components appearing on the line falling below a predetermined level, for example, 75 percent of the peak-to-peak signal. Following the threshold circuit are amplifiers 34 and 35 designed to increase the level of the signals passing the threshold circuit. Data reaching the receiver 12*b* is detected by the foregoing threshold. Such restored decoded amplified signals are then introduced by lead 27 into the utilization section 15 of computer 10**. Therefore, employing this invention as illustrated in FIG. 1, the computer installation 10 produces pulse trains of its normal single-polarity pulse format and receives only pulses in the same form. The transmission medium however receives complementary pulses with superior transmission capability as indicated.

Figure 2:
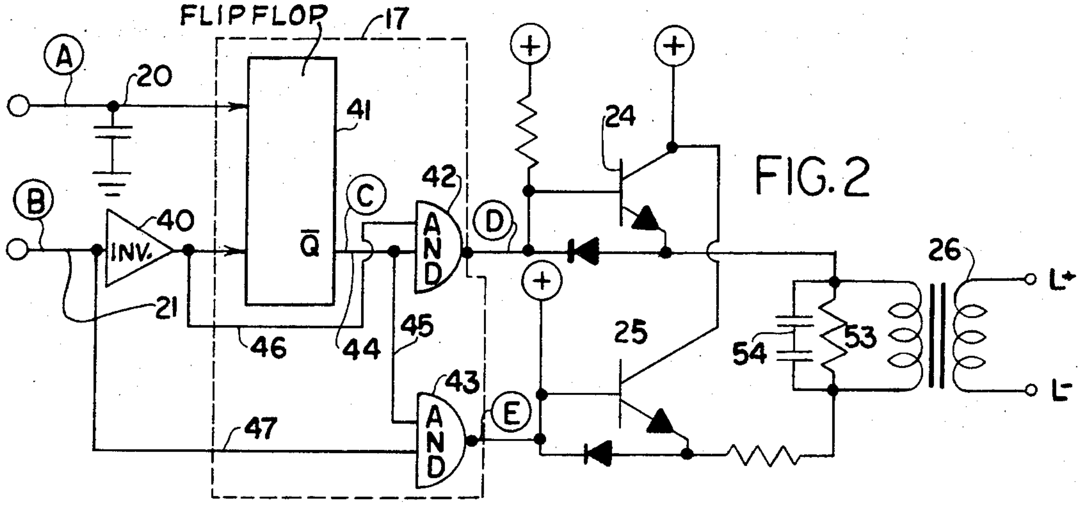
FIG. 2 is an electrical schematic of the encoding and transmission portions of this invention.

The encoder of FIG. 1 is better illustrated in FIG. 2.

Now referring to FIG. 2, showing the encoder section 12*a* of the invention of FIG. 1 in more detail. It includes the logic circuit 17 connected both to the data input lead 20 and the clock pulse lead 21 which may include an inverting amplifier 40. The logic circuit 17 includes basically a bistable multivibrator or flip-flop 41 which responds to data pulses A on lead 20 to produce an enabling pulse C to each of a pair of AND gates 42 and 43 over leads 44 and 45. The enabling pulse C of lead 44 as well as data pulse A, clock pulse B, are all illustrated in FIG. 3 in their proper time sequence. Flip-flop 41 is switched to its "on" condition by the sampling of data pulse A by the fall of clock pulse B. The flip-flop 41 remains in its on condition until the first trailing or falling edge of a clock pulse B occurs not coinciding with a data pulse. This operation is achieved employing a multivibrator of well known configuration, for example, D type flip-flop, page 32 Digital Logic Handbook 1968, Digital Equipment Corp. Clock pulses B originating on lead 21 and traversing the lead 46 constitute the first enabling input for the AND gate 42. Similar clock pulses on lead 21 and traversing branch 47 serve as the second enabling lead for AND gate 43.

Figure 3:
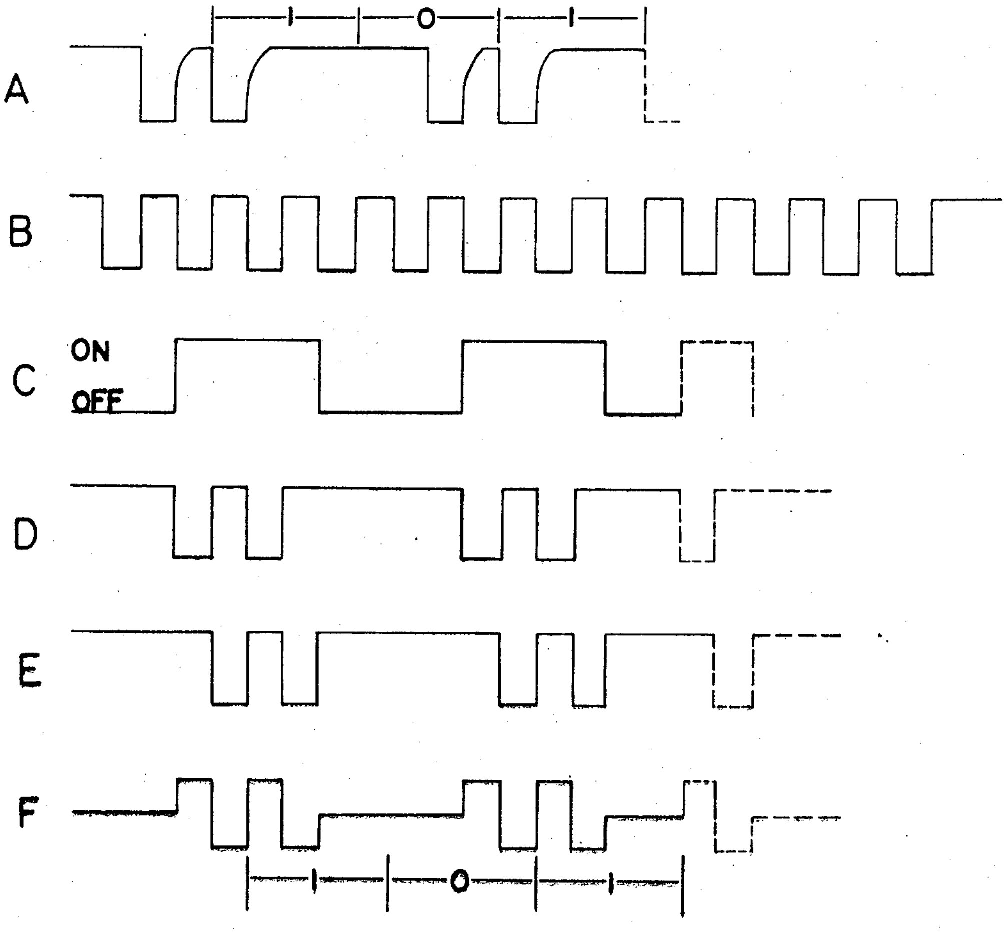
FIG. 3 is a graphical representation of significant wave forms in the encoder of FIG. 2.

The net effect of the logic described is illustrated in the two wave forms D and E of FIG. 3 constituting the output of the respective AND gates 42 and 43. The coincidence of clock pulses B and flip-flop pulse C is illustrated as wave form D constituting a pair of negative excursion pulses coinciding with the trailing edge of the inverted pulses A and incoming data whenever the flip-flop 41 is on. Similarly, the output of AND gate 43 constitutes a pair of negative excursion pulses displaced by one pulse width from the wave form D and of similar amplitude and duration. Both the pulse trains D and E are amplified in their respective transistor amplifiers 24 and 25 and then introduced to opposite terminals of the primary winding of a transformer 26. Suitable transient suppression is accomplished by a network consisting of a parallel resistor 53 and capacitors 54.

The sum of the two wave forms D and E appear across the output terminals of the secondary winding of transformer 26. This sum constitutes a wave form symmetrical about the axis and constituting a doublet for each pulse appearing in a wave form A.

Figure 4:
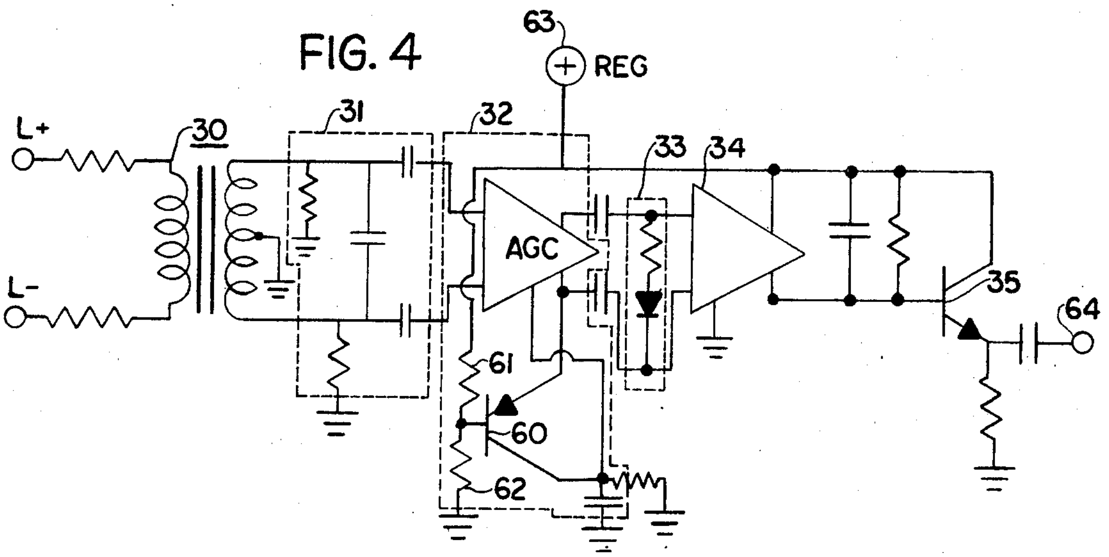
FIG. 4 is an electrical schematic of the decoding and pulse restoration portion of this invention.
Figure 5:
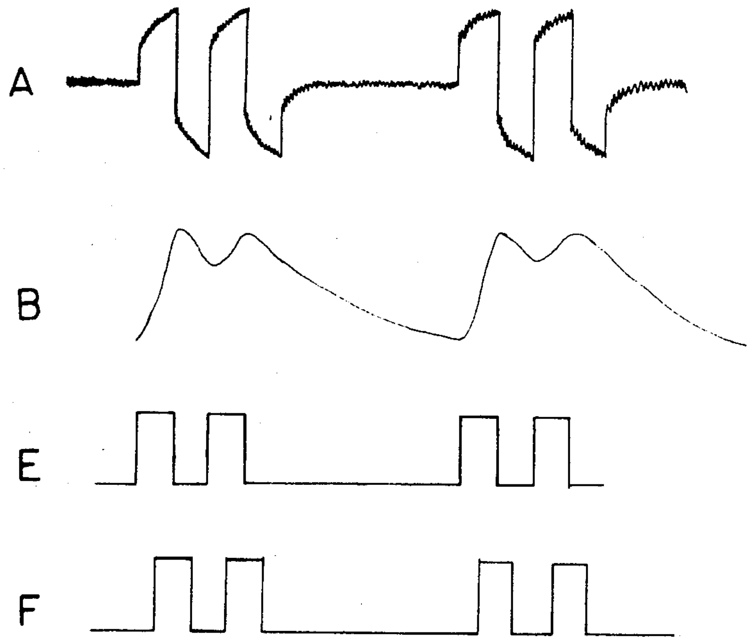
FIG. 5 is a graphical representation of significant wave forms encountered in the decoder of FIG. 4.

The receiver section 12B of this invention is shown in FIG. 4 and its associated wave forms appear in FIG. 5. The input terminals L+ and L− are connected to the transmission medium 11 with an input transformer 30 connected across the line L+, L−. The secondary winding of transformer 30 with its center tap grounded is connected via high pass filter 31 to an automatic gain control amplifier 32 comprising an AC amplifier voltage reference transistor 60. The transistor 60 has its base electrode connected to a voltage divider made up of resistor 61 and 62 connected between ground and regulated power supply 63. The AGC amplifier 32 provides a standard level of signal to the following circuitry and ultimately to the associated computer installation. Following the AGC amplifier 32 is the threshold circuit 33 made of a series connected resistor and diode in shunt across the signal path. The threshold device 33 serves as a half wave rectifier for signals at the output of the AGC amplifier 32 to restore the uni-directional pulse form of the original signal as received from the computer installation. The threshold installation also blocks any signals at amplitude level at less than a predetermined level, for example, those 25 percent peak-to-peak pulse heights. Automatic gain control circuit 32 and threshold circuit 33 provide the reconstructed pulse train. The transistor 35 constitutes a drive amplifier as a final stage to provide the appropriate level of pulses at terminal 64 corresponding to lead 27 of FIG. 1. Two typical wave shapes as arriving on the leads L+ and L− of the receiver of FIG. 4 are illustrated as curves A and B of FIG. 5. In FIG. 5, the curve A has retained the general doublet format with superimposed noise on the top of the pulses and with certain of the high frequency components missing resulting in the rounded leading edge of the pulses. The signal illustrated as curve A represent typical configuration of a noisy but principally resistive transmission medium. The curve B illustrates a typical worst case of distortion of the same signal over an unloaded line having poor frequency response. The negative excursions of both pulses are virtually lost and shift in the timing appears to have occurred. The circuitry of FIG. 4, however, is capable of restoring the pulses A above into the form exactly as transmitted as represented by curve E. In the worst case situation of B, the circuitry is capable of reproducing the signal as wave pulse train F. In this case, the pulse shape is correct with only the half pulse delay which may be easily compensated for by phase lock loop detection as accomplished in the optical transmission system described in the copending application Ser. No. 109,236 filed Jan. 25, 1971 of one of the inventors hereof.

Figure 6:
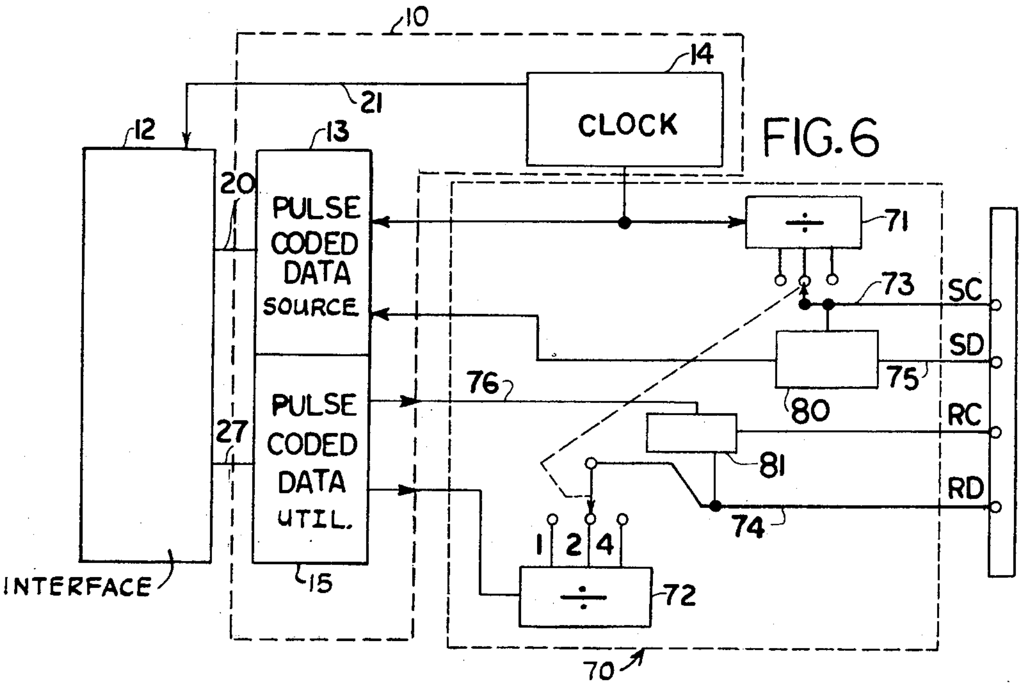
FIG. 6 is a block diagram of an alternate embodiment of this invention employing selectable data rates.

An alternate use of the apparatus of this invention is illustrated in FIG. 6. It employs the same interconnections with the computer installation 10 as in FIG. 1 which is now shown divided in its component sections, the pulse coded data source 13, clock 14, data utilization section 15 and the computational and other section 18. Added to the above is a digital data rate selector switch 70 interposed between the computational section 18 of the computer and the remainder of the computer installation. This data rate selector switch 70 includes a pair of selectable dividers 71 and 72 each connected in the clock signal paths 73 and 74 respectively designated the "send clock" and "receive clock" paths. Divider 71 is driven by clock source 14 which also provides clock pulses for data source 13 and the interface apparatus 12 of this invention. The two selectable dividers are mechanically ganged together to provide the identical data rates in both transmit and receive data channels.

In each data channel 75 and 76 respectively designated as "send data" and "receive data" there is a respective sample and store circuit 80 and 81 similar to flip-flop 41 of FIG. 2. These sample and store circuits 80 and 81 controlled by their respective dividers 71 and 72 sample data in the data channels 75 and 76 and retain the sample data until the next sample command arrives from its associate divider.

The purpose of sampler 80 is to insure maximum reliability of transfer of data since it looks at or samples data at only a precise period as determined by send-clock pulses on lead 73 which additionally controls the timing of computer send-data on lead 75.

The receiver sampler 81 samples data from the data utilization section 15 and samples that data and holds that data until the next sample control signal on lead 74 is received.

The purpose of the sample and store circuit 81 is to restore the received data to the same rate as the send data 75.

This arrangement allows the communications medium and interface unit to operate at a fixed data rate while allowing changes in the computer operational speed. The ability to allow the operation of the transmission medium and interface unit at a fixed data rate also allows multiple computer units operating at different rates to utilize identical interface units.

Figure 7A:
FIG. 7 is a graphical representation of pulse forms involved in this invention.
Figure 7B:
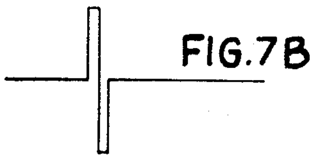
Figure 7C:
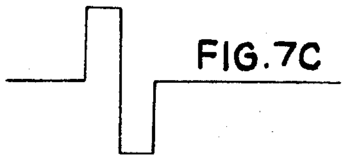
Figure 7D:
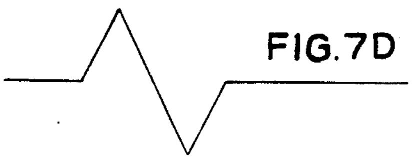
Figure 8:
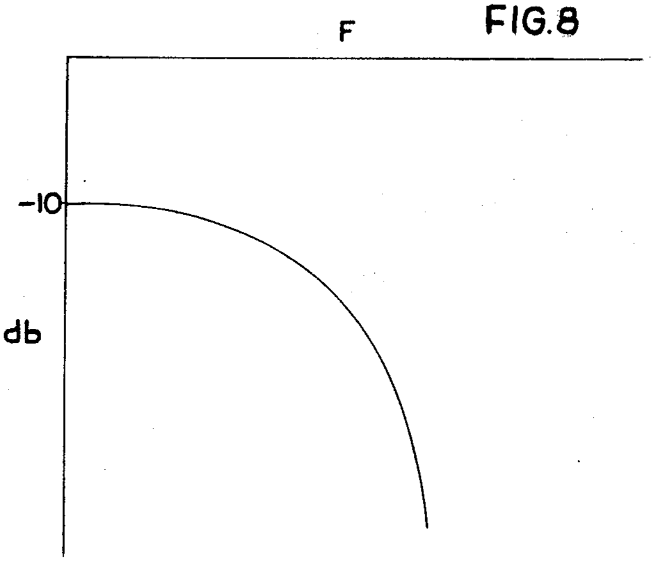
FIG. 8 is a graphical representation of typical transmission line attentuation characteristics encounterd by this system.

The fundamental basis for improved results employing this invention is demonstrated in FIGS. 7 and 9 where two are introduced into a typical transmission line having attenuation characteristics as shown in FIG. 8.

Figure 9A:
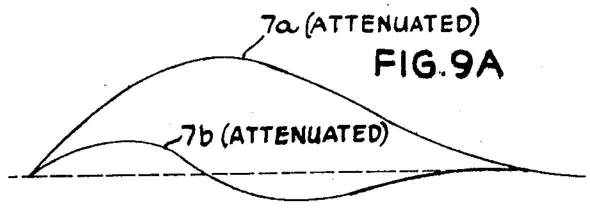
FIGS. 9A and 9B are graphical representations of transient response of a transmission medium to pulse coded signals.
Figure 9B:
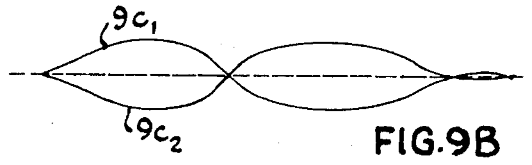

An impulse as shown in FIG. 7A when applied to a line FIG. 8A has a relative time response as shown in FIG. 9A as curve 7A (attenuated). If on the other hand a doublet as shown in FIG. 7B is applied to the same line as illustrated in its attenuated form as curve 9B (attenuated). Mathematically the doublet of FIG. 7B is the derivative of impulse of FIG. 7A and the wave form 7B (attenuated) of FIG. 9A similarly constitutes the derivative of curve 7A (attenuated). The pulse code modulating of a series of doublets 7B results in the wave forms 9C and $9C_2$ of FIG. 9B. In opposite phase signal, C2 is also represented in FIG. 9 which illustrates how binary coded ones or zeros may be transmitted over the line and detected at any sampling time by phase sensitive detector as described in the above referenced copending application. Suffice it to say that curves B, C1 and C2 compare with curve A. Curves 7C and 7D are the variations and equivalents of FIG. 7B and likewise may be generated and used in carrying out this invention.

Some significant characteristics of FIG. 9 are:

a. The D.C. average of the waveform is zero, i.e. there are no D.C. components or D.C. level shifts to the signal. Additionally, the signal starts and ends at zero.

b. The signal contains a zero crossing approximately midway between the start and end of the waveform. These three definite zero crossings can be used to good advantage as shown below.

If a series of doublets 7B are imposed on the line, the response waveform will be a series of responses similar to FIG. 9B with a rate of occurrence equal to the imposed signal rate. This rate can be measured by noting the period between zero crossings of the signal. When suitable filtering of the zero crossing data is made, i.e. (phase locklook detection), the frequency of the imposed signal can be accurately determined.

When a series of doublets 7B are imposed on the line such that a 180° time displacement is used for pulse coding, the waveform response with respect to the average rate of the doublet occurrence is shown as curves $9c_1$ and $9C_2$. Curve $9C_1$ shows the waveform response to a series of doblets while curve $9C_2$ shows the waveform response to that same series of doublets displaced by 180°. It is important to note that the zero crossing times are co-incident even through they are displaced 180° with respect to each other. This coincidence of zero crossings allows us to pulse code modulate the data while extracting the basic repetition rate with a phase locked loop.

One application for such waveform is as follows.

Digital data is encoded using pulse code modulation as shown in FIG. 3A and passed through interface unit 12 of FIG. 1 such that a 1 is encoded as a doublet and a 0 is encoded as a doublet displaced 180° from the 1 doublet as shown in FIG. 3F, and such coding has one doublet per data bit, i.e. an average repetition rate equal to the data rate. Detection of this coded data can be accomplished in the following manner. A phase locked loop is used to determine the average repetition rate by sensing the waveform zero crossings. A phase sensitive detector, used in conjunction with the phase locked loop, determines the phase of the received waveform and therefore determines the presence of a 1 or 0. This type of signal detection is accomplished employing the system of the copending application referenced above.

Alternate waveforms to FIG. 7B can be used with substantially identical results such as FIG. 7C or FIG. 7D. The important parameter is that the doublet is symmetrical around the zero axis and that the negative signal excursion is essentially the mirror image of the positive signal displaced in time.

The above-described embodiments of this invention are merely descriptive of its principles and are not to be considered limiting. The scope of this invention instead shall be determined from the scope of the following claims including their equivalents.

We claim:

1. Apparatus for optimizing transmission of pulse coded data over a transmission medium from a train of two level pulses and clock pulse comprising:

input means for receiving a train of information pulses indicative of binary 1's and 0's in the form of a pulse and a space;

input means receiving a series of clock pulses associated with said train of information pulses;

means responsive to each input pulse of a pulse train and to each clock pulse for generating a complement pulse for each said input pulse of the pulse train, said complement pulses being of opposite polarity from its respective input pulse of the pulse train of equal amplitude and displaced in time with the leading edge of the complement pulse substantially coincident with the trailing edge of its respective input pulse of the pulse train;

means controlled by said clock pulses for summing said input information pulses and complement pulses to provide a train of symetrical equal amplitude pulse doublets for said train of input information pulses;

means for introducing said train of summed pulses into said transmission medium.

2. Apparatus in accordance with claim 1 including receiver means for decoding trains of pulse doublets arriving over said medium;

said receiver including high pass filter means for blocking low frequency interference appearing at the receiver;

threshold means for discriminating against received signals at levels below a predetermined level, and rectifier means for blocking one polarity pulses in the incoming pulse doublet train to reconstruct the original pulse train.

3. The combination in accordance with claim 2 including automatic gain control amplifier means connected in said apparatus between said high pass filter and said threshold means whereby the train of pulse doublets is established at a predetermined amplitude level in said receiver.

4. The combination in accordance with claim 3 wherein said threshold means comprises a resistance and series diode in shunt across the transmission path for passing all signals above a predetermined level, and an amplifier following said threshold means for shaping said detected data pulses.

5. A data interface unit for connection of a computer installation to a transmission medium wherein the computer installation constitutes a source of a train of data pulses and a source of clock pulses;

said interface apparatus comprising;

logic circuitry connected to the data source and clock output of the computer installation;

said logic circuit including bistable multivibrator means connected to said source of data pulses and clock pulses;

first AND gate means connected to the computer installation source of clock pulses and said multivibrator;

means connected to said course of clock pulses for producing inverted clock pulses;

second AND gate means connected to said bistable multivibrator and source of inverted clock pulses;

said bistable multivibrator being operative to produce enabling input to said AND gates whereby said first and second AND gates produce output pulses of substantially identical form and opposite polarity;

means for summing the output of said first and second amplified AND gates to form a composite wave form constituting a doublet for each pulse and original data; and means for introducing a train of pulse doublets into the transmission medium.

6. The combination in accordance with claim 5 wherein said interface assembly including receiver means connected to said transmission medium for decoding pulse train of doublets comprising high pass filter for eliminating low frequency components in the received pulse train;

a threshold circuit for eliminating the signals below a predetermined level;

said threshold circuit having unidirectional co